United States Patent
Su et al.

(10) Patent No.: US 12,156,039 B2
(45) Date of Patent: Nov. 26, 2024

(54) SIGNAL CONTINUOUS COVERAGE METHOD, DEVICE AND APPARATUS FOR TARGET AREA, AND ANTENNA SYSTEM

(71) Applicants: CHINA MOBILE (CHENGDU) INFORMATION & TELECOMMUNICATION TECHNOLOGY CO., LTD., Sichuan (CN); CHINA MOBILE COMMUNICATIONS GROUP CO., LTD., Beijing (CN)

(72) Inventors: Yu Su, Beijing (CN); Shengwei Chen, Beijing (CN); Jian Zhou, Beijing (CN); Wenjing Wang, Beijing (CN); Yang Zhang, Beijing (CN)

(73) Assignees: CHINA MOBILE (CHENGDU) INFORMATION & TELECOMMUNICATION TECHNOLOGY CO., LTD., Sichuan (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 336 days.

(21) Appl. No.: 17/784,202

(22) PCT Filed: Sep. 30, 2020

(86) PCT No.: PCT/CN2020/119344
§ 371 (c)(1),
(2) Date: Jun. 10, 2022

(87) PCT Pub. No.: WO2021/114842
PCT Pub. Date: Jun. 17, 2021

(65) Prior Publication Data
US 2023/0040432 A1    Feb. 9, 2023

(30) Foreign Application Priority Data
Dec. 10, 2019    (CN) .......................... 201911262104.9

(51) Int. Cl.
*H04W 16/18* (2009.01)
*H04B 7/185* (2006.01)

(52) U.S. Cl.
CPC ........ *H04W 16/18* (2013.01); *H04B 7/18506* (2013.01)

(58) Field of Classification Search
CPC ...... H01Q 1/246; H01Q 1/28; H04B 7/18506; H04B 7/18504; H04W 16/18
See application file for complete search history.

(56) References Cited

U.S. PATENT DOCUMENTS

| 6,549,529 B1 | 4/2003 | Drabeck |
| 2009/0162071 A1 | 6/2009 | Refai |

(Continued)

FOREIGN PATENT DOCUMENTS

| CN | 102892124 A | 1/2013 |
| CN | 102938670 A | 2/2013 |

(Continued)

OTHER PUBLICATIONS

"On the Tradeoffs Between Coverage Radius, Altitude, and Beamwidth for Practical UAV Deployments", Dec. 2019, Haneya Naeem Qureshi and Ali Imran, IEEE Transactions on Aerospace and Electronic Systems, IEEE Service Center, Piscataway, NJ, US, vol. 55, No. 6, pp. 2805-2821.

(Continued)

*Primary Examiner* — Nader Bolourchi
(74) *Attorney, Agent, or Firm* — Cooper Legal Group, LLC

(57) ABSTRACT

Disclosed in the present application are a signal continuous coverage method, device and apparatus for a target area, and (Continued)

an antenna system. The signal continuous coverage method for a target area, which is used for an aircraft bearing a communication base station, comprises: acquiring the flight height, the farthest distance of a flight trajectory, the roll angle and a preset center position of a target area of the aircraft; acquiring a vertical half-power angle of an airborne antenna of the communication base station and a farthest signal coverage point position relative to the preset center position; on the basis of the flight height, the farthest distance of the flight trajectory, the roll angle, the preset center position, the vertical half-power angle and the farthest signal coverage point position, determining a target downward inclination angle of the airborne antenna; and adjusting a current downward inclination angle of the airborne antenna to the target downward inclination angle so as to enable a signal continuous coverage area to comprise the target area.

12 Claims, 7 Drawing Sheets

(56) References Cited

U.S. PATENT DOCUMENTS

| | | | |
|---|---|---|---|
| 2013/0182790 | A1 | 7/2013 | Jalali |
| 2016/0112116 | A1 | 4/2016 | Jalali et al. |
| 2016/0205560 | A1 | 7/2016 | Hyslop et al. |
| 2017/0026849 | A1 | 1/2017 | Stone et al. |
| 2017/0163336 | A1 | 6/2017 | Jalali et al. |
| 2017/0302368 | A1* | 10/2017 | Trott .................. H04B 7/18502 |
| 2017/0303137 | A1 | 10/2017 | Stone et al. |
| 2019/0014482 | A1 | 1/2019 | Stone et al. |
| 2019/0174326 | A1 | 6/2019 | Stone et al. |
| 2020/0015237 | A1 | 1/2020 | Huang et al. |
| 2021/0029554 | A1 | 1/2021 | Stone et al. |
| 2022/0225111 | A1 | 7/2022 | Stone et al. |

FOREIGN PATENT DOCUMENTS

| | | |
|---|---|---|
| CN | 105306131 A | 2/2016 |
| CN | 105516691 A | 4/2016 |
| CN | 106658531 A | 5/2017 |
| CN | 106937300 A | 7/2017 |
| CN | 107172723 A | 9/2017 |
| CN | 107196696 A | 9/2017 |
| CN | 107238373 A | 10/2017 |
| CN | 107277792 A | 10/2017 |
| CN | 107664491 A | 2/2018 |
| CN | 109714784 A | 5/2019 |
| CN | 109996241 A | 7/2019 |
| JP | 2001522191 A | 11/2001 |
| JP | 2009171514 A | 7/2009 |
| WO | 2019061104 A1 | 4/2019 |

OTHER PUBLICATIONS

"Optimal Deployments of UAVs with Directional Antennas for a Power-Efficient Coverage", Nov. 2019, Jun Guo, Philipp Walk and Hamid Jafarkhani, IEEE Transactions for Communication, vol. 6, Issue 8, Cornell University Library, 201OLIN Library Cornell, University, Ithaca NY, 29 pgs.

Supplementary European Search Report in the European application No. 20900276.5, mailed on Dec. 21, 2022, 9 pgs.

International Search Report in the international application No. PCT/CN2020/119344, mailed on Dec. 30, 2020, 3 pgs.

English translation of the Written Opinion of the International Search Authority in the international application No. PCT/CN2020/119344, mailed on Dec. 30, 2020, 4 pgs.

"The Design and Realization of Monitoring Platform for Police UAV Aviation State", Mar. 2018, Deng Nan, Telecommunications Engineering Technology and Standardization Engineering and Design, 2018 Issue 3, English Abstract on p. 5, 5 pgs.

* cited by examiner

SIGNAL CONTINUOUS COVERAGE METHOD, DEVICE AND APPARATUS FOR TARGET AREA, AND ANTENNA SYSTEM

CROSS-REFERENCE TO RELATED APPLICATIONS

This is a national phase application of International Application No. PCT/CN2020/119344, filed on Sep. 30, 2020, which claims priority to Chinese patent application No. 201911262104.9, filed in China on Dec. 10, 2019. The disclosures of International Application No. PCT/CN2020/119344 and Chinese patent application No. 201911262104.9 are hereby incorporated by reference in their entireties.

TECHNICAL FIELD

The disclosure belongs to the field of communication, and particularly relates to a method and apparatus for continuous signal coverage of a target region, an electronic device, and a computer storage medium.

BACKGROUND

A large-scale natural disaster (such as an earthquake, a typhoon, a flood, and a debris flow), a riot, a war, and other accidents beyond control may usually bring damages to various communication infrastructures. In order to cope with damages to communication infrastructures, governments and communication companies in the world set up multiple emergency communication systems. Such an emergency communication system generally consists of ground mobile emergency communication vehicles capable of serving as temporary base stations. However, when a road is congested or damaged, these ground mobile emergency communication vehicles cannot rush to a target region (such as a region affected by a natural disaster) timely to execute duties. Therefore, in such case, an air-space integrated emergency communication system is needed to provide communication service for the target region.

A conventional air-space integrated emergency communication system is structurally divided into three parts: a ground part, an air space, and a satellite part. In the air part, an aircraft carries a communication base station, i.e., an air base station, and circles in the air to implement signal coverage of the ground. However, as the position and flight attitude of the aircraft in the air changes, it is often impossible to implement continuous signal coverage of a target region, further resulting in a relatively poor quality of communication service (such as, a high call drop rate). This is a more fatal defect for emergency communication. Continuous signal coverage refers to signal coverage meeting requirements of basic call and data connection functions for a certain region on the ground in a whole operation process of the air base station.

Therefore, how to implement continuous signal coverage of a target region to further improve the quality of communication service for the target region is a technical problem urgent to be solved by those skilled in the art.

SUMMARY

Embodiments of the disclosure provide a method and apparatus for continuous signal coverage of a target region, an electronic device, and a computer storage medium, which are able to implement continuous signal coverage of the target region and further improve the quality of communication service for the target region.

A first aspect provides a method for continuous signal coverage of a target region, which may be applied to an aircraft carrying a communication base station. The method may include the following operations.

A flight height, a maximum flight trajectory distance, a roll angle of the aircraft, and a preset center position of the target region are acquired.

A vertical-Plane (V-Plane) Half Power beamwidth of an airborne antenna of the communication base station and a furthest signal coverage point position relative to the preset center position are acquired.

A target downward inclination angle of the airborne antenna is determined based on the flight height, the maximum flight trajectory distance, the roll angle, the preset center position, the V-Plane Half Power beamwidth, and the furthest signal coverage point position.

A present downward inclination angle of the airborne antenna is adjusted to the target downward inclination angle, to enable a continuous signal coverage region to include the target region.

In one example, the operation that the target downward inclination angle of the airborne antenna is determined based on the flight height, the maximum flight trajectory distance, the roll angle, the preset center position, the V-Plane Half Power beamwidth, and the furthest signal coverage point position may include the following operations.

Antenna direction information and a horizontal-Plane (H-Plane) Half Power beamwidth of the airborne antenna are acquired.

An antenna type of the airborne antenna is determined based on the antenna direction information, the H-Plane Half Power beamwidth, and the V-Plane Half Power beamwidth.

The target downward inclination angle of the airborne antenna is determined based on the antenna type, the flight height, the maximum flight trajectory distance, the roll angle, the preset center position, the V-Plane Half Power beamwidth, and the furthest signal coverage point position. Therefore, the target downward inclination angle of the airborne antenna may be determined more accurately.

In one example, the operation that the antenna type of the airborne antenna is determined based on the antenna direction information, the H-Plane Half Power beamwidth, and the V-Plane Half Power beamwidth may include the following operations.

It is determined, based on the antenna direction information, whether the airborne antenna is an inside antenna or a non-inside antenna. The inside antenna is an airborne antenna with a direction orientated towards an inside of a flight trajectory of the aircraft.

A Half Power beamwidth difference is calculated based on the H-Plane Half Power beamwidth and V-Plane Half Power beamwidth of the inside antenna in response to determining that the airborne antenna is the inside antenna.

It is determined that the inside antenna is a first inside antenna in response to determining that the Half Power beamwidth difference is greater than a first preset Half Power beamwidth difference threshold.

It is determined that the inside antenna is a second inside antenna in response to determining that the Half Power beamwidth difference is less than a second preset Half Power beamwidth difference threshold. The antenna type of the airborne antenna may be determined more accurately.

In one example, when the airborne antenna is the first inside antenna, the operation that the target downward inclination angle of the airborne antenna is determined based on the antenna type, the flight height, the maximum flight trajectory distance, the roll angle, the preset center position, the V-Plane Half Power beamwidth, and the furthest signal coverage point position may include the following operations.

A first distance between the preset center position and the furthest signal coverage point position is calculated.

The target downward inclination angle of the airborne antenna is determined based on the first distance, the maximum flight trajectory distance, the flight height, the V-Plane Half Power beamwidth, and the roll angle. The target downward inclination angle of the airborne antenna may be determined more accurately.

In one example, when the airborne antenna is the second inside antenna, the operation that the target downward inclination angle of the airborne antenna is determined based on the antenna type, the flight height, the maximum flight trajectory distance, the roll angle, the preset center position, the V-Plane Half Power beamwidth, and the furthest signal coverage point position may include the following operations.

A closest signal coverage point position of the airborne antenna relative to the preset center position is acquired.

A second distance between the closest signal coverage point position and the furthest signal coverage point position is calculated.

The target downward inclination angle of the airborne antenna is determined based on the second distance, the maximum flight trajectory distance, the flight height, the V-Plane Half Power beamwidth, and the roll angle. The target downward inclination angle of the airborne antenna may be determined more accurately.

In one example, after the operation that the present downward inclination angle of the airborne antenna is adjusted to the target downward inclination angle, to enable a continuous signal coverage region to include the target region, the method may further include the following operation.

Reference Signal Receiving Power (RSRP) of a user terminal in the target region is acquired. Therefore, the quality of communication service for the target region may be detected.

A second aspect provides an apparatus for continuous signal coverage of a target region, which may be applied to an aircraft carrying a communication base station. The apparatus may include a first acquisition module, a second acquisition module, a determination module, and an adjustment module.

The first acquisition module may be configured to acquire a flight height, a maximum flight trajectory distance, a roll angle of the aircraft, and a preset center position of the target region.

The second acquisition module may be configured to acquire a V-Plane Half Power beamwidth of an airborne antenna of the communication base station and a furthest signal coverage point position relative to the preset center position.

The determination module may be configured to determine a target downward inclination angle of the airborne antenna based on the flight height, the maximum flight trajectory distance, the roll angle, the preset center position, the V-Plane Half Power beamwidth, and the furthest signal coverage point position.

The adjustment module may be configured to adjust a present downward inclination angle of the airborne antenna to the target downward inclination angle, to enable a continuous signal coverage region to include the target region.

In one example, the determination module may include an acquisition submodule, an antenna type determination submodule, and a target downward inclination angle determination submodule.

The acquisition submodule may be configured to acquire antenna direction information and an H-Plane Half Power beamwidth of the airborne antenna.

The antenna type determination submodule may be configured to determine an antenna type of the airborne antenna based on the antenna direction information, the H-Plane Half Power beamwidth, and the V-Plane Half Power beamwidth.

The target downward inclination angle determination submodule may be configured to determine the target downward inclination angle of the airborne antenna based on the antenna type, the flight height, the maximum flight trajectory distance, the roll angle, the preset center position, the V-Plane Half Power beamwidth, and the furthest signal coverage point position.

In one example, the antenna type determination submodule may include an antenna type determination unit, a Half Power beamwidth difference calculation unit, a first inside antenna determination unit, and a second inside antenna determination unit.

The antenna type determination unit may be configured to determine, based on the antenna direction information, whether the airborne antenna is an inside antenna or a non-inside antenna, the inside antenna being an airborne antenna with a direction orientated towards an inside of a flight trajectory of the aircraft.

The Half Power beamwidth difference calculation unit may be configured to calculate, in response to that the airborne antenna is the inside antenna, a Half Power beamwidth difference based on the H-Plane Half Power beamwidth and V-Plane Half Power beamwidth of the inside antenna.

The first inside antenna determination unit may be configured to determine that the inside antenna is a first inside antenna in response to determining that the Half Power beamwidth difference is greater than a first preset Half Power beamwidth difference threshold.

The second inside antenna determination unit may be configured to determine that the inside antenna is a second inside antenna in response to determining that the Half Power beamwidth difference is less than a second preset Half Power beamwidth difference threshold.

In one example, when the airborne antenna is the first inside antenna, the target downward inclination angle determination submodule may include a first distance calculation unit and a target downward inclination angle determination unit.

The first distance calculation unit may be configured to calculate a first distance between the preset center position and the furthest signal coverage point position.

The target downward inclination angle determination unit may be configured to determine the target downward inclination angle of the airborne antenna based on the first distance, the maximum flight trajectory distance, the flight height, the V-Plane Half Power beamwidth, and the roll angle.

In one example, when the airborne antenna is the second inside antenna, the target downward inclination angle determination submodule may include a position acquisition unit, a second distance calculation unit, and a target downward inclination angle determination unit.

The position acquisition unit may be configured to acquire a closest signal coverage point position of the airborne antenna relative to the preset center position.

The second distance calculation unit may be configured to calculate a second distance between the closest signal coverage point position and the furthest signal coverage point position.

The target downward inclination angle determination unit may be configured to determine the target downward inclination angle of the airborne antenna based on the second distance, the maximum flight trajectory distance, the flight height, the V-Plane Half Power beamwidth, and the roll angle.

In one example, the apparatus for continuous signal coverage of the target region may further include an RSRP acquisition module.

The RSRP acquisition module may be configured to acquire RSRP of a user in the target region.

A third aspect provides an electronic device, which may include a processor and a memory storing a computer program instruction.

The processor may execute the computer program instruction to implement the method for continuous signal coverage of the target region in the first aspect.

A fourth aspect provides a computer storage medium, which may store a computer program instruction. The computer program instruction, when executed by a processor, implements the method for continuous signal coverage of the target region in the first aspect.

A fifth aspect provides an antenna system for implementing continuous signal coverage of a target region, which may be carried by the aircraft carrying the communication base station in the first aspect. The antenna system may include an airborne antenna, configured to send and receive a communication signal of a satellite or a user terminal. The airborne antenna may include an inside antenna or a non-inside antenna. The inside antenna may include a first inside antenna and a second inside antenna.

The embodiments of the disclosure provide a method and apparatus for continuous signal coverage of a target region, an electronic device, and a computer storage medium, which can implement continuous signal coverage of a target region and further improve the quality of communication service for the target region. In the method for continuous signal coverage of the target region, the target downward inclination angle of the airborne antenna is determined based on the flight height, the maximum flight trajectory distance, the roll angle, the preset center position, the V-Plane Half Power beamwidth, and the furthest signal coverage point position, and then the present downward inclination angle of the airborne antenna is adjusted to the target downward inclination angle to enable the continuous signal coverage region to include the target region. That is, continuous signal coverage of the target region may be implemented.

BRIEF DESCRIPTION OF THE DRAWINGS

In order to describe the technical solutions of the embodiments of the disclosure more clearly, the drawings required to be used in the embodiments of the disclosure will be briefly introduced below. Those of ordinary skill in the art may further obtain other drawings according to these drawings without creative work.

DETAILED DESCRIPTION

Features and exemplary embodiments of each aspect of the disclosure will be described below in detail. In order to make the objectives, technical solutions, and advantages of the disclosure clearer, the disclosure will further be described below in detail in combination with the drawings and specific embodiments. It is to be understood that the specific embodiments described herein are only configured to explain the disclosure rather than limiting the disclosure. Those skilled in the art may implement the disclosure without some of these specific details. The following descriptions about the embodiments are only for illustrating examples of the disclosure to provide a better understanding of the disclosure.

It is to be noted that a relational term herein such as first and second is used only to distinguish an entity or operation from another entity or operation and does not necessarily require or imply existence of any practical relationship or sequence between these entities or operations. Moreover, terms "include" and "contain" or any other variation thereof are intended to cover nonexclusive inclusions, so that a process, method, object, or device including a series of elements not only includes those elements but also includes other elements that are not clearly listed, or further includes elements intrinsic to the process, the method, the object, or the device. With no more restrictions, an element defined by statement "including a/an . . . " does not exclude existence of the same other elements in a process, method, object, or device including the element.

A conventional air-space integrated emergency communication system is structurally divided into three parts: a ground part, an air space, and a satellite part. In the air part, an aircraft carries a communication base station, i.e., an air base station, and circles in the air to implement signal coverage of the ground. However, as the position and flight attitude of the aircraft in the air changes, it is often impossible to implement continuous signal coverage of a target region, further resulting in a relatively poor quality of communication service (such as, a high call drop rate). This is a more fatal defect for emergency communication. Continuous signal coverage refers to signal coverage meeting requirements of basic call and data connection functions for a certain region on the ground in a whole operation process of the air base station.

In order to solve the related technical problems, the embodiments of the disclosure provide a method and apparatus for continuous signal coverage of a target region, an electronic device, and a computer storage medium. The method for continuous signal coverage of a target region in the embodiments of the disclosure will be introduced first.

Figure 1:
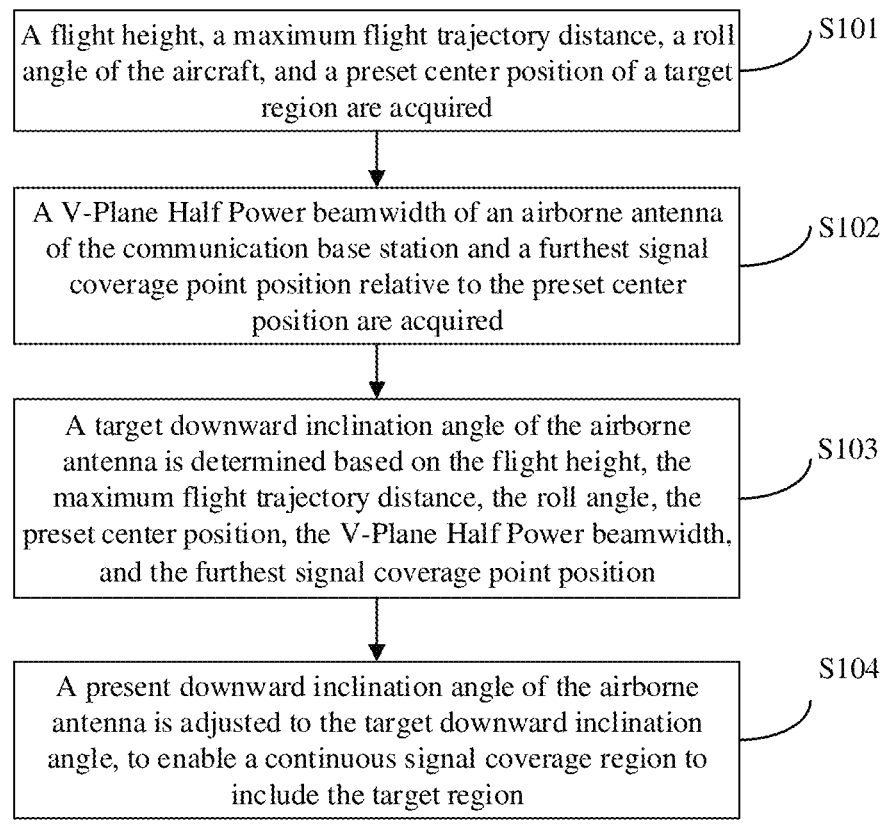
FIG. 1 is a flowchart of a method for continuous signal coverage of a target region according to an embodiment of the disclosure.

FIG. 1 is a flowchart of a method for continuous signal coverage of a target region according to an embodiment of the disclosure. The method is applied to an aircraft carrying a communication base station. As shown in FIG. 1, the method includes the following operations.

In S101, a flight height, a maximum flight trajectory distance, a roll angle of the aircraft, and a preset center position of a target region are acquired.

In S102, a vertical-Plane (V-Plane) Half Power beamwidth of an airborne antenna of the communication base station and a furthest signal coverage point position relative to the preset center position are acquired.

In S103, a target downward inclination angle of the airborne antenna is determined based on the flight height, the maximum flight trajectory distance, the roll angle, the preset center position, the V-Plane Half Power beamwidth, and the furthest signal coverage point position.

In S104, a present downward inclination angle of the airborne antenna is adjusted to the target downward inclination angle, to enable a continuous signal coverage region to include the target region.

The aircraft may be a fixed-wing aircraft, and may further be a manned fixed-wing aircraft or unmanned fixed-wing aircraft. The aircraft carries the communication base station, and thus usually needs to satisfy the following conditions.

(1) Requirement for a load of the aircraft: the aircraft may fly when carrying the communication base station (including at least one airborne antenna) and a satellite communication device.

(2) Requirement for a flight trajectory of the aircraft: the aircraft may circle in the air at a preset altitude.

(3) Requirement for power supply power: the power supply power of the aircraft may meet a power consumption requirement of the communication base station.

Figure 2:
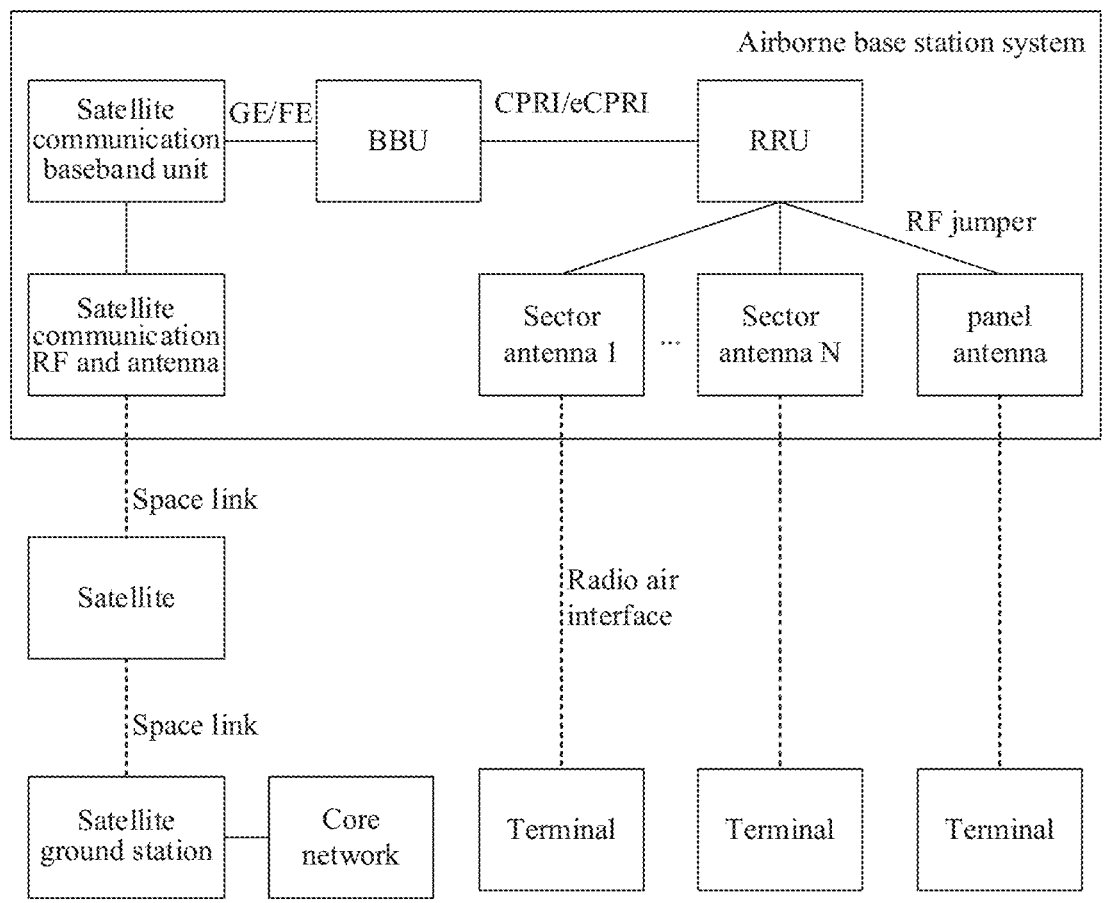
FIG. 2 is a structure diagram of an emergency communication system according to an embodiment of the disclosure.

Exemplarily, FIG. 2 is a structure diagram of an emergency communication system including a fixed-wing aircraft. An airborne base station system in FIG. 2 is a system carried by the aircraft. A Remote Radio Unit (RRU) is connected to a Building Base band Unit (BBU) through a Common Public Radio Interface (CPRI) or an Enhanced CPRI (eCPRI). The BBU is connected to a satellite communication baseband unit through a Gigabit Ethernet (GE) interface or a Fast Ethernet (FE) interface. The satellite communication baseband unit is connected with a satellite communication Radio Frequency (RF) and an antenna. The satellite communication RF and the antenna perform information transmission with a satellite through a space link. The satellite also performs information transmission with a satellite ground station through a space link. The satellite ground station is connected to a core network. The RRU is connected with sector antenna 1, . . . , sector antenna N, and panel antenna 1 through RF jumpers, respectively. Panel antenna 1 and each sector antenna perform information transmission with a corresponding terminal through radio air interfaces, respectively. The BBU and the RRU may be arranged in a cabin of the fixed-wing aircraft, and sector antenna 1, . . . , sector antenna N, and panel antenna 1 are arranged at a lower portion of the fixed-wing aircraft. Alternatively, the RRU, sector antenna 1, . . . , sector antenna N, and panel antenna 1 may be integrated into an Active Antenna Unit (AAU), the AAU is arranged at the lower portion of the fixed-wing aircraft, and the BBU is arranged in the cabin of the fixed-wing aircraft.

In an embodiment, a flight trajectory may be a circle, an approximate circle, or a polygon, and a maximum flight trajectory distance is a maximum distance of a certain point on the flight trajectory relative to a flight center. When the flight trajectory is a circle, the maximum flight trajectory distance (which may be set as R) is a flight trajectory radius distance. Based on the flight trajectory of the aircraft, a roll angle (which may be set as $\gamma$) and a pitch angle (which may be set as $\theta$) of the aircraft may be determined.

In an embodiment, a projection point of a preset center position (which may be set as O) of a target region on a plane where a flight height (which may be set as h) is located is usually determined as the flight center. The target region is usually a region with a relatively poor quality of communication service, such as a region affected by a natural disaster. The preset center position and region range of the target region may be set correspondingly by those skilled in the art.

At least one airborne antenna is arranged on the communication base station carried by the aircraft. Each airborne antenna has a respective V-Plane Half Power beamwidth (which may be set as $\beta$), horizontal-Plane (H-Plane) Half Power beamwidth, and furthest signal coverage point position (which may be set as G) and closest signal coverage point position relative to the preset center position.

After the flight height, the maximum flight trajectory distance, the roll angle, the preset center position, the V-Plane Half Power beamwidth, and the furthest signal coverage point position of the aircraft are acquired, a target downward inclination angle (which may be set as $\alpha$) of the airborne antenna is determined based on the flight height, the maximum flight trajectory distance, the roll angle, the preset center position, the V-Plane Half Power beamwidth, and the furthest signal coverage point position. Then, a present downward inclination angle of the airborne angle is adjusted to the target downward inclination angle such that a continuous signal coverage region includes the target region. Therefore, continuous signal coverage of the target region may be implemented, and the quality of communication service for the target region is further improved.

In order to determine the downward inclination angle of the airborne antenna more accurately, in an embodiment, the operation that the target downward inclination angle of the airborne antenna is determined based on the flight height, the maximum flight trajectory distance, the roll angle, the preset center position, the V-Plane Half Power beamwidth, and the furthest signal coverage point position may usually include the following operations. Antenna direction information and a H-Plane Half Power beamwidth of the airborne antenna are acquired. An antenna type of the airborne antenna is determined based on the antenna direction information, the H-Plane Half Power beamwidth, and the V-Plane Half Power beamwidth. The target downward inclination angle of the airborne antenna is determined based on the antenna type, the flight height, the maximum flight trajectory distance, the roll angle, the preset center position, the V-Plane Half Power beamwidth, and the furthest signal coverage point position.

In order to determine the antenna type of the airborne antenna more accurately, in an embodiment, the operation that the antenna type of the airborne antenna is determined based on the antenna direction information, the H-Plane Half Power beamwidth, and the V-Plane Half Power beamwidth may usually include the following operations. It is determined, based on the antenna direction information, whether the airborne antenna is an inside antenna or a non-inside antenna. The inside antenna is an airborne antenna with a direction orientated towards an inside of a flight trajectory of the aircraft. When it is determined that the airborne antenna is the inside antenna, a Half Power beamwidth difference is calculated based on the H-Plane Half Power beamwidth and the V-Plane Half Power beamwidth of the inside antenna. It is determined that the inside antenna is a first inside antenna in response to determining that the Half Power beamwidth difference is greater than a first preset Half Power beamwidth difference threshold. It is determined that the inside antenna is a second inside antenna in response to determining that the Half Power beamwidth difference is less than a second preset Half Power beamwidth difference threshold. The non-inside antenna is an edge antenna with a direction orientated towards the non-inside of the flight trajectory. Multiple inside antennae and multiple edge antennae may be arranged on the aircraft. The multiple inside antennae may be set as ANT1, ANT2, . . . , and ANTn, respectively (n is a positive integer). The multiple edge antennae may be set as ANT~1, ANT~2, . . . , and ANT~m, respectively (m is a positive integer).

Figure 3:
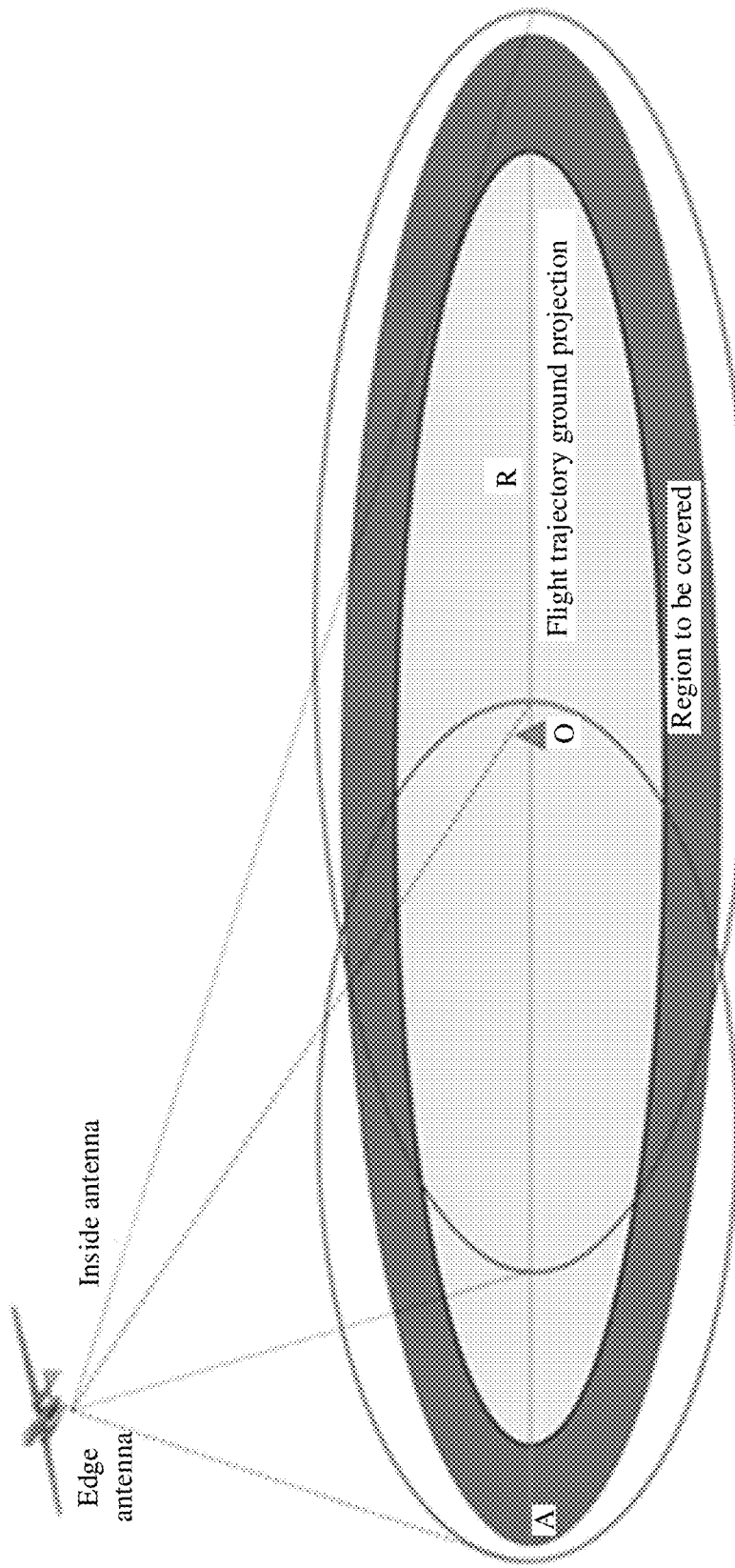
FIG. 3 is a schematic diagram of signal coverage at time T1 according to an embodiment of the disclosure.
Figure 4:
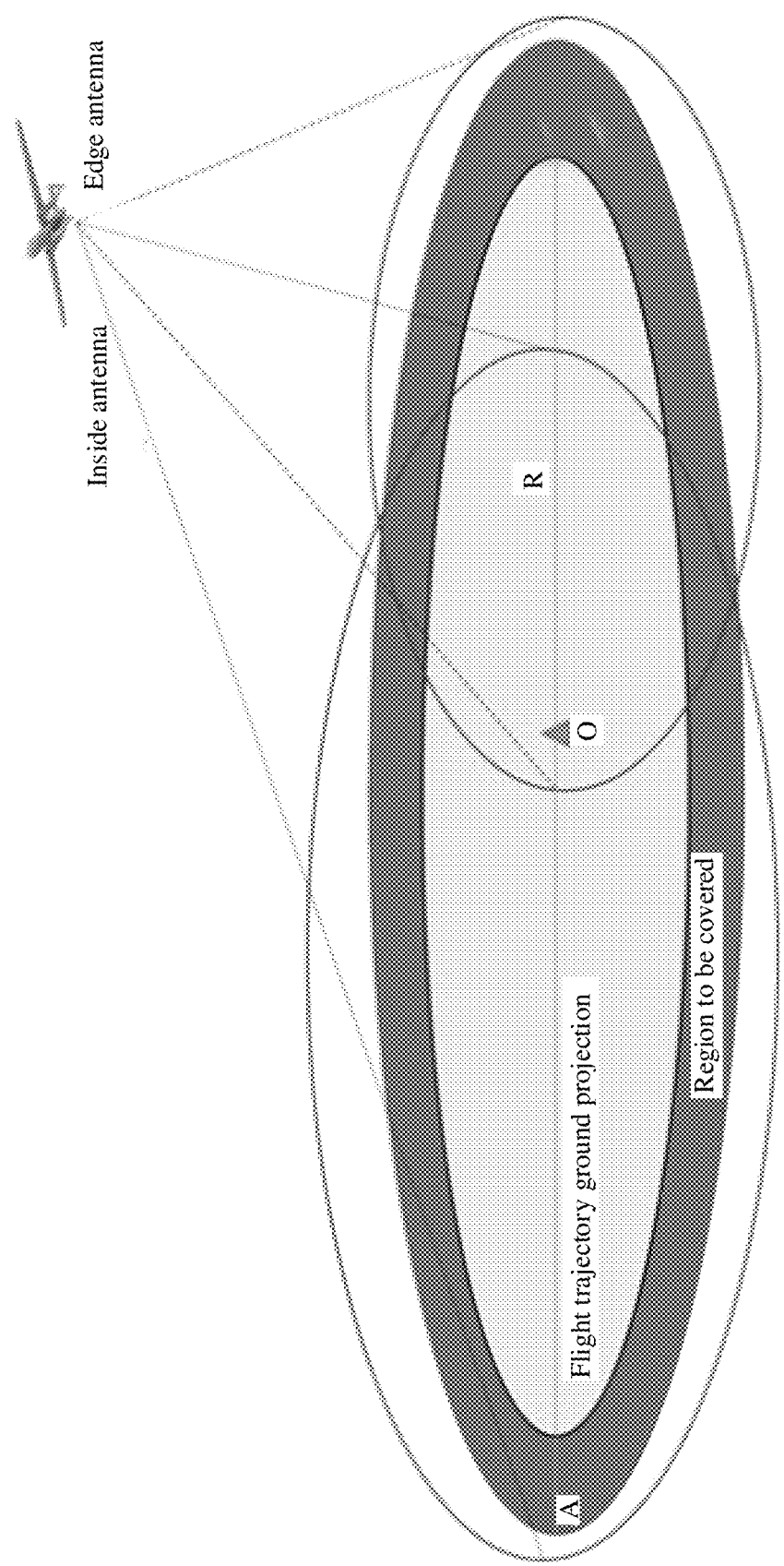
FIG. 4 is a schematic diagram of signal coverage at time T2 according to an embodiment of the disclosure.

Through the inside antenna and the edge antenna, the aircraft may implement continuous coverage of the ground without any physical changes during operation. In an embodiment, FIG. 3 and FIG. 4 are schematic diagrams of signal coverage at time T1 and time T2 respectively. A region to be covered is a circle with a radius OA (which may be set as R~). At time T1, the aircraft is located over the due west of the preset center position O of the region to be covered, covers the east side of the region to be covered on the ground through the inside antenna, and covers the west side of the region to be covered through the edge antenna. At time T2, the aircraft is located over the due east of the point O, covers the west side of the region to be covered on the ground through the inside antenna, and covers the east side of the region to be covered through the edge antenna. Therefore, the same region on the ground usually corresponds to different antennae at different time. The mutual complementation of the inside antenna and the edge antenna implements coverage of the target region at any time, thereby forming temporal continuous coverage.

When it is determined that the airborne antenna is the inside antenna, a Half Power beamwidth difference is calculated based on the H-Plane Half Power beamwidth and the V-Plane Half Power beamwidth of the inside antenna. It is determined that the inside antenna is a first inside antenna in response to determining that the Half Power beamwidth difference is greater than a first preset Half Power beamwidth difference threshold. In an embodiment, the first preset Half Power beamwidth difference threshold may be set to 60%, and when the Half Power beamwidth difference is greater than 60%, the first inside antenna is an inside antenna with a large angle difference between the H-Plane Half Power beamwidth and the V-Plane Half Power beamwidth. It is determined that the inside antenna is a second inside antenna in response to determining that the Half Power beamwidth difference is less than a second preset Half Power beamwidth difference threshold. In an embodiment, the second preset Half Power beamwidth difference threshold may be set to 10%, and when the Half Power beamwidth difference is less than 10%, the second inside antenna is an inside antenna with a small angle difference between the H-Plane Half Power beamwidth and the V-Plane Half Power beamwidth.

In order to determine the target downward inclination angle of the airborne antenna more accurately, in an embodiment, when the airborne antenna is the first inside antenna, during determination of the target downward inclination angle of the airborne antenna based on the antenna type, the flight height, the maximum flight trajectory distance, the roll angle, the preset center position, the V-Plane Half Power beamwidth, and the furthest signal coverage point position, the method includes the following operations. A first distance between the preset center position and the furthest signal coverage point position is calculated. The target downward inclination angle of the airborne antenna is determined based on the first distance, the maximum flight trajectory distance, the flight height, the V-Plane Half Power beamwidth, and the roll angle.

Figure 5:
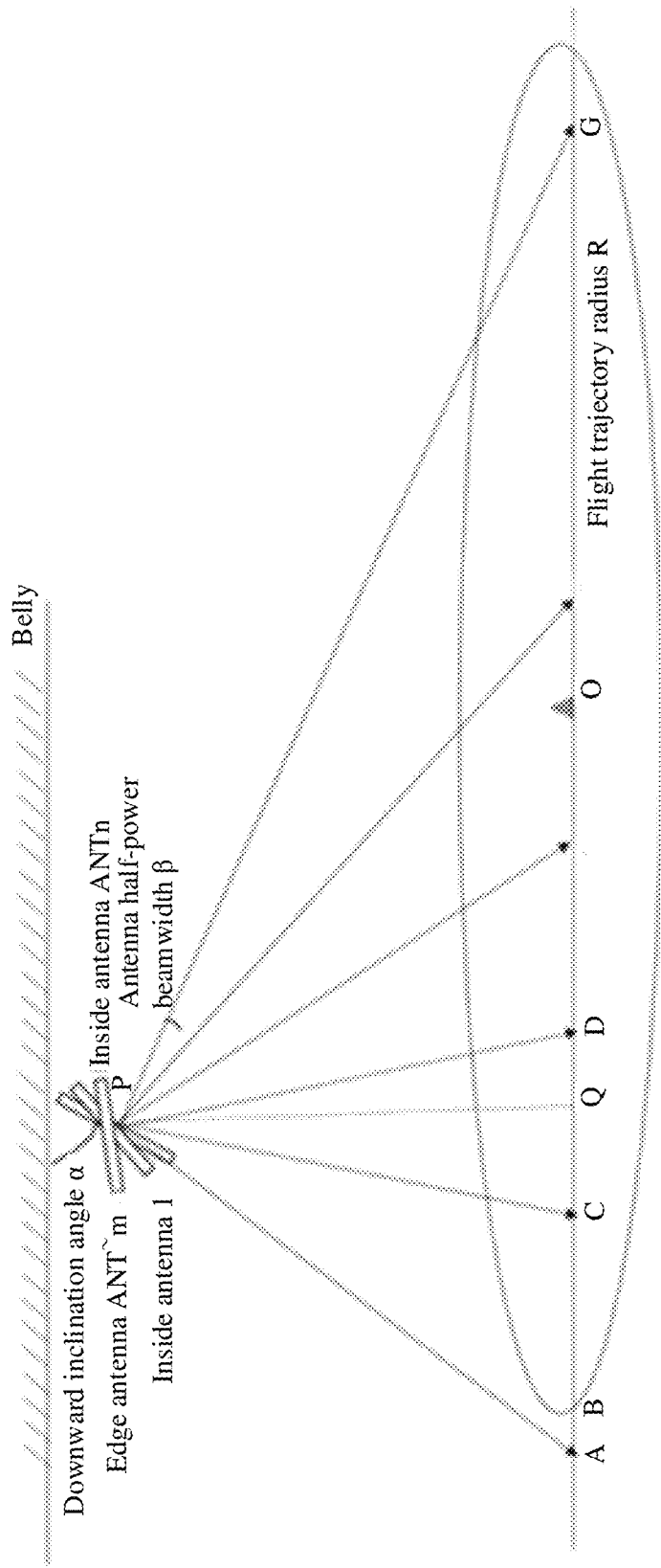
FIG. 5 is a schematic diagram of continuous signal coverage according to an embodiment of the disclosure.

In an embodiment, all inside antennae are the first inside antennae. As shown in FIG. 5, a deviation angle of a transmitting direction of the inside antenna to an inside of a circling path of the fixed-wing aircraft is an azimuth (which may be set as $\varepsilon_n$, n representing the number of the inside antennae), and an included angle between a belly of the fixed-wing aircraft and the airborne antenna is a downward inclination angle of the airborne antenna, which does not include a roll angle (which may be set as $\gamma$) of the airframe during circling of the fixed-wing aircraft. A downward inclination angle of the inside antenna ANT1 is $\alpha_1$, and a downward inclination angle $\alpha_n$ of the inside antenna ANTn is adjusted based on $\alpha_1$, so as to overcome the shortcoming of relatively small area of a long and narrow continuous coverage region on the ground. A V-Plane Half Power beamwidth of the inside antenna is $\beta_n$, a V-Plane Half Power beamwidth of the edge antenna is $\beta_m\tilde{\ }$ represents the number of the edge antennae), a downward inclination angle of the edge antenna ANT~1 is $\alpha_1\tilde{\ }$, and a downward inclination angle of the edge antenna ANT~m is $\alpha_m\tilde{\ }$. A pitch angle of the fixed-wing aircraft is $\theta$, and a flight height of the fixed-wing aircraft is h.

In FIG. 5, P represents the airborne antenna, point O is a position of a geometric center point of the target region for continuous coverage, OB represents a flight trajectory radius R, point G is a furthest signal coverage point of the inside antenna relative to point O, point C is a closest signal coverage point of the inside antenna relative to point O, A is a furthest signal coverage point of the edge antenna relative to point O, and D is a closest signal coverage point of the edge antenna relative to point O. PA and PG are maximum transmission distances of the air base station for continuous coverage of the ground. It may be determined whether a transmission distance required by a client is satisfied according to a transmitting power of the air base station to the ground terminal, an antenna gain, a space link loss, multi-path fading, and other factors. The space link loss is most important (the other factors are common methods for a ground base station system in the related art, and will not be elaborated herein), and numerical values of PA and PG may be determined by a free-space loss model: Pathloss=32.5+20l gF+20l gD (where Pathloss takes dB as a unit, F is an RF point taking GHz as a unit, and D is the transmission distance taking m as a unit). Theoretically, OG>0 and OC>0 are required, otherwise there is no continuous signal coverage region.

In order to achieve the continuous signal coverage effects in FIG. 3 and FIG. 4, it is required that OG≥R~, OA≥R~ (R~ represents a radius of the target region) and the edge antenna and the inside antenna are overlapped in coverage, namely OC>OD.

A continuous coverage area is approximately as follows.

(1) In case of OA≥OG, the continuous signal coverage area is an area of a circle with a radius of OG.

(2) In case of OA<OG, the continuous signal coverage area is an area of a circle with a radius of OA.

In order to enable the continuous signal coverage region to include the target region, the following may be obtained:

$$OG = h \times \tan(\alpha_1 + \beta_1 - \gamma) - R \qquad (1).$$

OG is a distance between the preset center position O of the target region and the furthest signal coverage point G of the inside antenna ANT1, h is the flight height of the aircraft, $\alpha_1$ is the downward inclination angle of the inside antenna ANT1, $\beta_1$ is the V-Plane Half Power beamwidth of the inside antenna ANT1, $\gamma$ is the roll angle of the aircraft, and R is the flight trajectory radius distance.

The downward inclination angle $\alpha_1$ of the inside antenna ANT1 may be obtained according to formula (2):

$$\alpha_1 = \arctan\left(\frac{OG + R}{h}\right) - \beta_1 + \gamma. \qquad (2)$$

The downward inclination angle $\alpha_n$ of the inside antenna ANTn may be obtained based on the downward inclination angle $\alpha_1$ of ANT1:

$$\alpha_n = \alpha_{(n-1)} - n\beta_n \qquad (3).$$

Similarly, the downward inclination angle $\alpha_1^\sim$ of the edge antenna ANT$^\sim$1 may be obtained:

$$\alpha_1^\sim = \arctan\left(\frac{OA - R}{h}\right) - \beta_1^\sim - \gamma. \qquad (4)$$

OA is a distance between the preset center position O of the target region and the furthest signal coverage point A of the edge antenna ANT$^\sim$1, h is the flight height of the aircraft, $\beta^\sim 1$ is the V-Plane Half Power beamwidth of the edge antenna ANT$^\sim$1, $\gamma$ is the roll angle of the aircraft, and R is the flight trajectory radius distance.

The downward inclination angle $\alpha_m^\sim$ of the edge antenna ANT$^\sim$m may be obtained based on the downward inclination angle $\alpha_1^\sim$ of the edge antenna ANT$^\sim$1:

$$\alpha_m^\sim = \alpha_{m-1}^\sim + m\beta_m^\sim \qquad (5).$$

The azimuth $\varepsilon_n$, of the airborne antenna may be obtained according to the pitch angle $\theta$ and flight direction of the aircraft.

(1) When the aircraft flies clockwise, $\varepsilon_n$ is deviated radially clockwise by $\theta$.

(2) When the aircraft flies counterclockwise, $\varepsilon_n$ is deviated radially counterclockwise by $\theta$.

In order to determine the target downward inclination angle of the airborne antenna more accurately, in another embodiment, when the airborne antenna is the second inside antenna, during determination of the target downward inclination angle of the airborne antenna based on the antenna type, the flight height, the maximum flight trajectory distance, the roll angle, the preset center position, the V-Plane Half Power beamwidth, and the furthest signal coverage point position, the method includes the following operations. A closest signal coverage point position of the airborne antenna relative to the preset center position is acquired. A second distance between the closest signal coverage point position and the furthest signal coverage point position is calculated. The target downward inclination angle of the airborne antenna is determined based on the second distance, the maximum flight trajectory distance, the flight height, the V-Plane Half Power beamwidth, and the roll angle.

Figure 6:
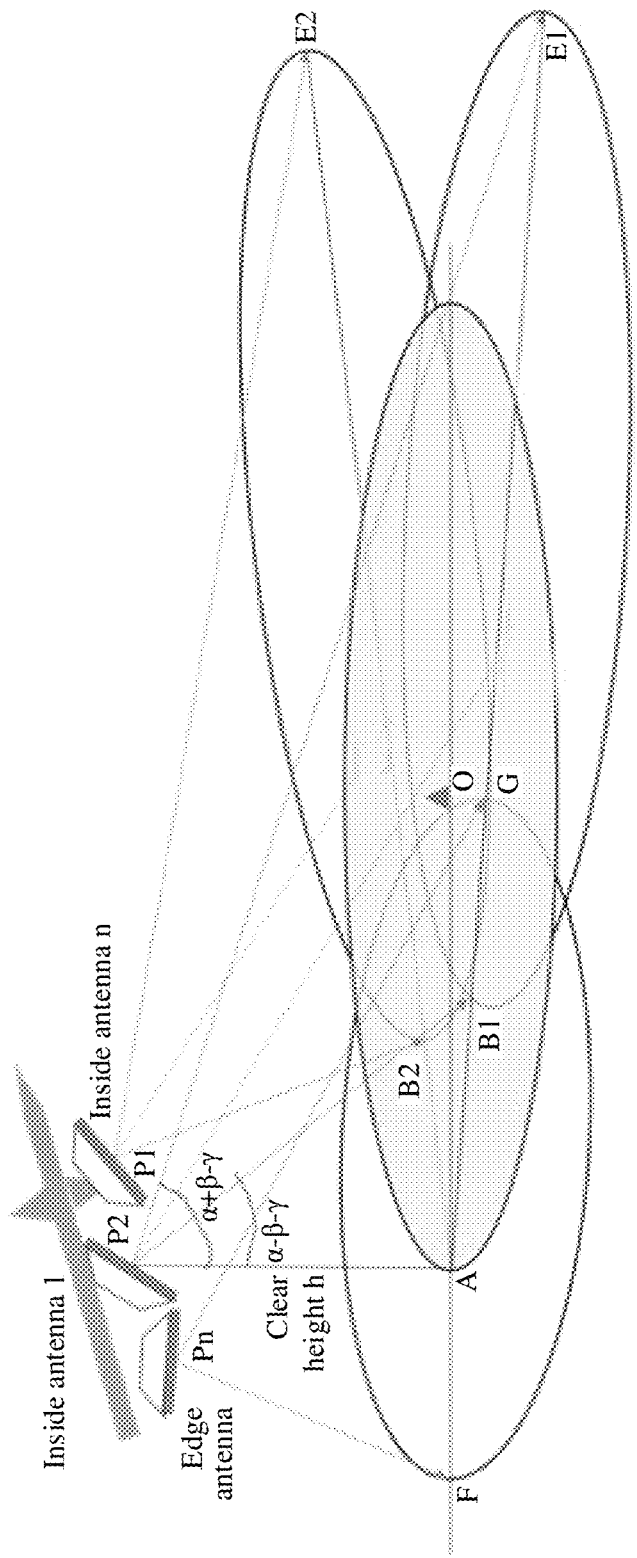
FIG. 6 is another schematic diagram of continuous signal coverage according to an embodiment of the disclosure.

In an embodiment, all inside antennae are the second inside antennae. As shown in FIG. 6, $P_n$ represents the airborne antenna, an azimuth of the inside antenna is $\varepsilon_n$ (11 represents the number of the inside antennae), a downward inclination angle of the inside antenna ANT1 is $\alpha_1$, and a downward inclination angle $\alpha_n$ of the inside antenna ANTn is adjusted based on $\alpha_1$, so as to overcome the shortcoming of relatively small area of a long and narrow continuous coverage region on the ground. A V-Plane Half Power beamwidth of the inside antenna is $\beta_n$, a V-Plane Half Power beamwidth of the edge antenna is $\beta_m^\sim$ (m represents the number of the edge antennae), a downward inclination angle of the edge antenna ANT$^\sim$1 is $\alpha_1^\sim$, and a downward inclination angle of the edge antenna ANT$^\sim$m is $\alpha_m^\sim$. A pitch angle of the fixed-wing aircraft is $\theta$, a flight height of the fixed-wing aircraft is h, and a roll angle of the fixed-wing aircraft is $\gamma$. OA is a flight trajectory radius R, $E_1, E_2, \ldots E_n$ are furthest signal coverage points of the respective inside antennae relative to the preset center position O of the target region respectively, $B_1, B_2, \ldots, B_n$ are closest signal coverage points of the respective inside antennae relative to the preset center position O of the target region respectively, $F_1, F_2, \ldots, F_m$ are furthest signal coverage points of the respective edge antennae relative to the preset center position O of the target region respectively, and $G_1, G_2, \ldots, G_m$ are closest signal coverage points of the respective edge antennae relative to the preset center position O of the target region respectively. $P_n E_n$, and $P_n F_m$ are maximum transmission distances of the air base station for continuous coverage of the ground. It may be determined whether a transmission distance required by a client is acceptable according to a transmitting power of the air base station to the ground terminal, an antenna gain, a space link loss, multi-path fading, and other factors. The space link loss is most important (the other factors are common methods for a ground base station system in the related art, and will not be elaborated herein), and numerical values of $P_n E_n$, and $P_n F_m$ may be determined by a free-space loss model: Pathloss=32.5+20l gF+20l gD (where Pathloss takes dB as a unit, F is an RF point taking GHz as a unit, and D is the transmission distance taking m as a unit).

In order to achieve the continuous signal coverage effects in FIG. 3 and FIG. 4, it is required that $OE_n \geq R^\sim$, $OF_m \geq R^\sim$ ($R^\sim$ represents a radius of the target region) and the edge antenna and the inside antenna are overlapped in coverage, namely $OB_n \geq OG_m$.

In order to enable the continuous signal coverage region to include the target region, the following may be obtained:

$$B_n E_n = h \times \tan(\alpha_n + \beta_n - \gamma) - \frac{R}{2}. \qquad (6)$$

The downward inclination angle $\alpha_n$ of the inside antenna ANTn may be obtained according to formula (6):

$$\alpha_n = \arctan\left(\frac{B_n E_n + \frac{R}{2}}{h}\right) - \beta_n + \gamma. \qquad (7)$$

Similarly, the downward inclination angle $\alpha_m^\sim$ of the edge antenna ANT$^\sim$m may be obtained:

$$\alpha_m^\sim = \alpha_{m-1}^\sim + m\beta_n^\sim - \gamma \qquad (8).$$

The azimuth $\varepsilon_1$ of the inside antenna may be obtained according to the pitch angle θ and flight direction of the aircraft.

When the aircraft flies clockwise, an azimuth $\varepsilon_1$ of the inside antenna ANT1 is deviated radially clockwise by η+θ, 83°, and the V-Plane Half Power beamwidth $\beta_2$ is 30°. The roll angle γ is 7°. The pitch angle θ is 5°. The azimuth ε is 20°. In addition, the base station uses Frequency Division Duplex (FDD) 900M.

TABLE 1

| Coverage area (square kilometer) | Coverage radius | Downward inclination angle α of the antenna | V-Plane Half Power beamwidth β | Roll angle γ of the aircraft | Flight trajectory radius | Flight absolute altitude | Maximum coverage distance | RSRP (dBm) |
|---|---|---|---|---|---|---|---|---|
| 3.14 | 1000 | 37.04 | 29 | 7 | 1500 | 1500 | 2915.48 | −93.26 |
| 3.14 | 1000 | 29.34 | 29 | 7 | 1500 | 2000 | 3201.56 | −94.16 |
| 3.14 | 1000 | 23.00 | 29 | 7 | 1500 | 2500 | 3535.53 | −95.11 |
| 7.07 | 1500 | 41.43 | 29 | 7 | 1500 | 1500 | 3354.10 | −94.60 |
| 7.07 | 1500 | 34.31 | 29 | 7 | 1500 | 2000 | 3605.55 | −95.29 |
| 7.07 | 1500 | 28.19 | 29 | 7 | 1500 | 2500 | 3905.12 | −96.06 |
| 12.57 | 2000 | 44.80 | 29 | 7 | 1500 | 1500 | 3807.89 | −95.82 |
| 12.57 | 2000 | 38.26 | 29 | 7 | 1500 | 2000 | 4031.13 | −96.36 |
| 12.57 | 2000 | 32.46 | 29 | 7 | 1500 | 2500 | 4301.16 | −96.98 |
| 28.27 | 3000 | 49.57 | 29 | 7 | 1500 | 1500 | 4743.42 | −97.92 |
| 28.27 | 3000 | 44.04 | 29 | 7 | 1500 | 2000 | 4924.43 | 498.27 |
| 28.27 | 3000 | 38.95 | 29 | 7 | 1500 | 2500 | 5147.82 | 498.70 | where η is an angle not greater than the V-Plane Half Power beamwidth of the inside antenna, and may be set to $$\frac{2}{3}\beta.$$

An azimuth $\varepsilon_2$ of the inside antenna ANT2 is deviated radially counterclockwise by η-θ. When the number of the inside antennae is larger than 2, an azimuth of an antenna when n is an odd number is $\varepsilon_n=\eta+(n-1)\theta$, and an azimuth of an antenna when n is an even number is $\varepsilon_n=\eta-(n-1)\theta$.

When the aircraft flies counterclockwise, the azimuth $\varepsilon_1$ of the inside antenna ANT1 is deviated radially clockwise by η+θ, where η is an angle not greater than the V-Plane Half Power beamwidth of the inside antenna, and may be set to $$\frac{2}{3}\beta.$$

The azimuth $\varepsilon_2$ of the inside antenna ANT2 is deviated radially counterclockwise by η-θ. When the number of the inside antennae is larger than 2, an azimuth of an antenna when n is an odd number $\varepsilon_n=\eta+(n-1)\theta$, and an azimuth of an antenna when n is an even number is $\varepsilon_n=\eta-(n-1)\theta$.

In order to detect the quality of communication service for the target region, in an embodiment, after the present downward inclination angle of the airborne antenna is adjusted to the target downward inclination angle to enable a continuous signal coverage region to include the target region, the method further includes that: RSRP of a user terminal in the target region is acquired.

In an embodiment, simulation analysis may be performed according to Table 1. Simulation conditions are as follows: a flight absolute altitude h is 2,000 m, a circling radius R is 1,500 m, and simulation is performed by clockwise flight according to a real electronic Three-Dimensional (3D) map. The downward inclination angle $\alpha_1$ of the inside antenna 1 is 40°, and the V-Plane Half Power beamwidth A is 30°. The downward inclination angle $\alpha_2$ of the inside antenna 2 is A simulation result map may be obtained according to Table 1. In the simulation result map, a diameter of an outer circle is 6 km, a diameter of an inner circle is 3 km, and the target coverage region is the inner circle. The above simulation shows that RSRP of the target coverage region (the inner circle) on the ground is above −80 dBm, which is within the valid range. It indicates that that this air base station solution is feasible.

The simulation analysis also shows that the minimum RSRP at an edge of the outer circle is above −90 dBm, which completely meets an access requirement of the ground terminal. Therefore, a practical continuous coverage region obtained by this solution is larger than a design value, and continuous coverage of the target ground region may be implemented pertinently.

According to the method for continuous signal coverage of a target region in the embodiments of the disclosure, the target downward inclination angle of the airborne antenna is determined based on the flight height, the maximum flight trajectory distance, the roll angle, the preset center position, the V-Plane Half Power beamwidth, and the furthest signal coverage point position, and then the present downward inclination angle of the airborne antenna is adjusted to the target downward inclination angle such that the continuous signal coverage region includes the target region. Therefore, continuous signal coverage of the target region may be implemented, and the quality of communication service for the target region is further improved. In addition, large-area continuous coverage of the ground may be implemented without changing horizontal and vertical angles of the airborne angle during flight in real time by a device such as a gimbal, so that the cost is low.

Figure 7:
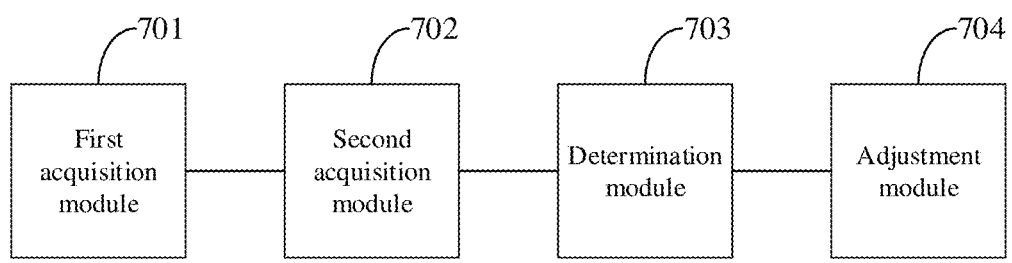
FIG. 7 is a structure diagram of an apparatus for continuous signal coverage of a target region according to an embodiment of the disclosure.

An apparatus for continuous signal coverage of a target region, an electronic device, and a computer storage medium provided in the embodiments of the disclosure will be introduced below. The apparatus for continuous signal coverage of a target region, the electronic device, and the computer storage medium described below and the method for continuous signal coverage of a target region described above may correspondingly refer to each other. FIG. 7 is a structure diagram of an apparatus for continuous signal coverage of a target region according to an embodiment of the disclosure. The apparatus for continuous signal coverage of a target region is applied to an aircraft carrying a communication base station. As shown in FIG. 7, the apparatus for continuous signal coverage of a target region includes a first acquisition module 701, a second acquisition module 702, a determination module 703, and an adjustment module 704.

The first acquisition module 701 is configured to acquire a flight height, a maximum flight trajectory distance, a roll angle of the aircraft, and a preset center position of a target region.

The second acquisition module 702 is configured to acquire a V-Plane Half Power beamwidth of an airborne antenna of the communication base station and a furthest signal coverage point position relative to the preset center position.

The determination module 703 is configured to determine a target downward inclination angle of the airborne antenna based on the flight height, the maximum flight trajectory distance, the roll angle, the preset center position, the V-Plane Half Power beamwidth, and the furthest signal coverage point position.

The adjustment module 704 is configured to adjust a present downward inclination angle of the airborne antenna to the target downward inclination angle, to enable a continuous signal coverage region to include the target region.

In one example, the determination module 703 includes an acquisition submodule, an antenna type determination submodule, and a target downward inclination angle determination submodule.

The acquisition submodule is configured to acquire antenna direction information and an H-Plane Half Power beamwidth of the airborne antenna.

The antenna type determination submodule is configured to determine an antenna type of the airborne antenna based on the antenna direction information, the H-Plane Half Power beamwidth, and the V-Plane Half Power beamwidth.

The target downward inclination angle determination submodule is configured to determine the target downward inclination angle of the airborne antenna based on the antenna type, the flight height, the maximum flight trajectory distance, the roll angle, the preset center position, the V-Plane Half Power beamwidth, and the furthest signal coverage point position.

In one example, the antenna type determination submodule includes an antenna type determination unit, a Half Power beamwidth difference calculation unit, a first inside antenna determination unit, and a second inside antenna determination unit.

The antenna type determination unit is configured to determine, based on the antenna direction information, whether the airborne antenna is an inside antenna or a non-inside antenna. The inside antenna is an airborne antenna with a direction orientated towards an inside of a flight trajectory of the aircraft.

The Half Power beamwidth difference calculation unit is configured to calculate, in response to that the airborne antenna is the inside antenna, a Half Power beamwidth difference based on the H-Plane Half Power beamwidth and the V-Plane Half Power beamwidth of the inside antenna.

The first inside antenna determination unit is configured to determine that the inside antenna is a first inside antenna in response to determining that the Half Power beamwidth difference is greater than a first preset Half Power beamwidth difference threshold.

The second inside antenna determination unit is configured to determine that the inside antenna is a second inside antenna in response to determining that the Half Power beamwidth difference is less than a second preset Half Power beamwidth difference threshold.

In one example, when the airborne antenna is the first inside antenna, the target downward inclination angle determination submodule includes a first distance calculation unit and a target downward inclination angle determination unit.

The first distance calculation unit is configured to calculate a first distance between the preset center position and the furthest signal coverage point position.

The target downward inclination angle determination unit is configured to determine the target downward inclination angle of the airborne antenna based on the first distance, the maximum flight trajectory distance, the flight height, the V-Plane Half Power beamwidth, and the roll angle.

In one example, when the airborne antenna is the second inside antenna, the target downward inclination angle determination submodule includes a position acquisition unit, a second distance calculation unit, and a target downward inclination angle determination unit.

The position acquisition unit is configured to acquire a closest signal coverage point position of the airborne antenna relative to the preset center position.

The second distance calculation unit is configured to calculate a second distance between the closest signal coverage point position and the furthest signal coverage point position.

The target downward inclination angle determination unit is configured to determine the target downward inclination angle of the airborne antenna based on the second distance, the maximum flight trajectory distance, the flight height, the V-Plane Half Power beamwidth, and the roll angle.

In one example, the apparatus for continuous signal coverage of the target region further includes an RSRP acquisition module.

The RSRP acquisition module is configured to acquire RSRP of a user in the target region.

Each module in the apparatus for continuous signal coverage of a target region in FIG. 7 has a function of implementing respective operation in the embodiment shown in FIG. 1, and achieves the same technical effect as the method for continuous signal coverage of a target region in FIG. 1. For brief and clarity of description, elaborations are omitted herein.

Figure 8:
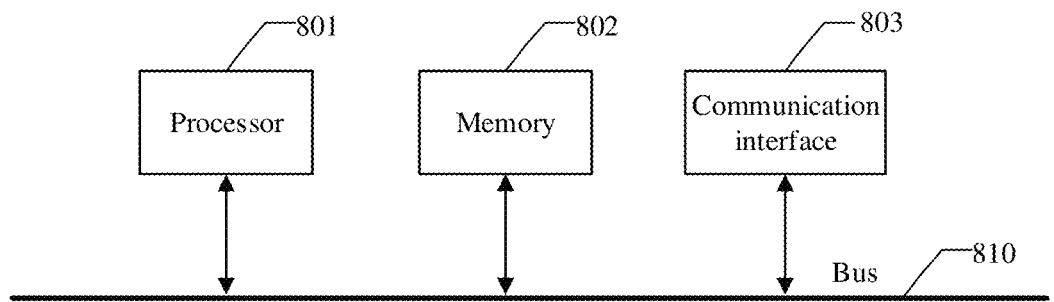
FIG. 8 is a structure diagram of an electronic device according to an embodiment of the disclosure.

FIG. 8 is a structure diagram of an electronic device according to an embodiment of the disclosure.

The electronic device may include a processor 801 and a memory 802 storing a computer program instruction.

Specifically, the processor 801 may include a Central Processing Unit (CPU), or an Application Specific Integrated Circuit (ASIC), or one or more integrated circuits that may be configured to implement the embodiments of the disclosure.

The memory 802 may include a high-capacity memory for data or instructions. It is exemplarily but unlimitedly described that the memory 802 may include a Hard Disk Driver (HDD), a floppy disk drive, a flash memory, an optical disk, a magneto-optical disk, a tape, a Universal Serial Bus (USB) driver, or a combination of two or more of the above. If appropriate, the memory 802 may include a removable or irremovable (or fixed) medium. If appropriate, the memory 802 may be inside or outside a disaster recovery device of an integrated gateway. In a specific embodiment, the memory 802 is a nonvolatile solid-state memory. In a specific embodiment, the memory 802 includes a Read-Only Memory (ROM). If appropriate, the ROM may be a mask programmable ROM, a Programmable ROM (PROM), an Erasable PROM (EPROM), an Electrically EPROM (EEPROM), an Electrically Alterable PROM (EAROM), a flash memory, or a combination of two or more of the above.

The processor 801 reads and executes the computer program instruction stored in the memory 802 to implement any method for continuous signal coverage of a target region in the above-mentioned embodiments.

In an example, the electronic device may further include a communication interface 803 and a bus 810. As shown in FIG. 8, the processor 801, the memory 802, and the communication interface 803 are connected and communicate with one another through the bus 810.

The communication interface 803 is mainly configured to implement communications between each module, apparatus, unit, and/or device in the embodiments of the disclosure.

The bus 810 includes hardware, software, or both, and couples components of an online data traffic charging device. It is exemplarily but unlimitedly described that the bus may include an Accelerated Graphics Port (AGP) or other graphics bus, an Extended Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association (VESA) Local Bus (VLB) or other suitable bus, or a combination of two or more of the above. If appropriate, the bus 810 may include one or more buses. Although a specific bus is described and shown in the embodiment of the disclosure, any suitable bus or interconnect is considered in the disclosure.

In addition, in combination with the method for continuous signal coverage of a target region in the above-mentioned embodiments, an embodiment of the disclosure may provide a computer storage medium for implementation. The computer storage medium stores a computer program instruction. The computer program instruction is executed by a processor to implement any method for continuous signal coverage of a target region in the above-mentioned embodiments.

An embodiment of the disclosure also provides an antenna system for implementing continuous signal coverage of a target region, which is carried by the aircraft carrying the communication base station in the first aspect. The antenna system includes an airborne antenna, configured to send and receive a communication signal of a satellite or a user terminal. The airborne antenna includes an inside antenna or a non-inside antenna. The inside antenna includes a first inside antenna and a second inside antenna.

It is to be noted that the disclosure is not to be limited to specific configurations and processing described above and shown in the drawings. For brevity, detailed descriptions about known methods are omitted herein. A plurality of specific operations are described and shown in the above-mentioned embodiments as examples. However, the process of the method of the disclosure is not limited to the described and shown specific operations, and those skilled in the art may make various variations, modifications, and additions or change a sequence of the operations after understanding the spirit of the disclosure.

The function blocks shown in the structure block diagram may be implemented as hardware, software, firmware, or a combination thereof. When being implemented as hardware, the function block may be, for example, an electronic circuit, an ASIC, and suitable firmware, plug-in, and functional card. When being implemented as software, the element of the disclosure is a program or code segment for executing a required task. The program or code segment may be stored in a machine-readable medium, or transmitted on a transmission medium or communication link by a data signal contained in a carrier. The "machine-readable medium" may include any medium capable of storing or transmitting information. Examples of the machine-readable medium include an electronic circuit, a semiconductor memory device, a ROM, a flash memory, an Erasable ROM (EROM), a floppy disk, a Compact Disc ROM (CD-ROM), an optical disk, a hard disk, an optical fiber medium, an RF link, etc. The code segment may be downloaded through a computer network, such as the Internet and an intranet.

It is also to be noted that some methods or systems are described in the exemplary embodiments mentioned in the disclosure based on a series of operations or apparatuses. However, the disclosure is not limited to the sequence of the operations. That is, the operations may be executed according to the sequence mentioned in the embodiments, or a sequence different from that in the embodiments, or a plurality of operations may be executed at the same time.

The above is only the specific implementation mode of the disclosure. Those skilled in the art may clearly learn about that specific working processes of the system, module and unit described above may refer to the corresponding processes in the method embodiments and will not be elaborated herein for convenient and brief description. It is to be understood that the scope of protection of the disclosure is not limited thereto. Various equivalent modifications or replacements are apparent to those skilled in the art within the technical scope disclosed by the disclosure, and these modifications or replacements shall fall within the scope of protection of the disclosure.

The invention claimed is:

1. A method for continuous signal coverage of a target region, applied to an aircraft carrying a communication base station, the method comprising:
acquiring a flight height, a maximum flight trajectory distance, a roll angle of the aircraft, and a preset center position of the target region;
acquiring a vertical-Plane (V-Plane) Half Power beamwidth of an airborne antenna of the communication base station and a furthest signal coverage point position relative to the preset center position;
acquiring antenna direction information and a horizontal-Plane (H-Plane) Half Power beamwidth of the airborne antenna;
determining an antenna type of the airborne antenna based on the antenna direction information, the H-Plane Half Power beamwidth, and the V-Plane Half Power beamwidth, the antenna type comprising an inside antenna and a non-inside antenna;
determining a target downward inclination angle of the airborne antenna by using formula (1) or formula (2) based on the antenna type, the flight height, the maximum flight trajectory distance, the roll angle, the preset center position, the V-Plane Half Power beamwidth, and the furthest signal coverage point position;

$$\alpha_1 = \arctan\left(\frac{OG+R}{h}\right) - \beta_1 + \gamma \qquad (1)$$

where $\alpha_1$ is the target downward inclination angle of the inside antenna when the airborne antenna is the inside antenna, h is the flight height, R is the maximum flight trajectory distance, $\gamma$ is the roll angle, $\beta_1$ is the V-Plane Half Power beamwidth of the inside antenna, and OG is a distance between the preset center position and the furthest signal coverage point position of the inside antenna;

$$\alpha_1^\sim = \arctan\left(\frac{OA - R}{h}\right) - \beta_1^\sim - \gamma \tag{2}$$

where $\alpha^\sim_1$ is the target downward inclination angle of the non-inside antenna when the airborne antenna is the non-inside antenna, $\beta^\sim_1$ is the V-Plane Half Power beamwidth of the non-inside antenna, and OA is a distance between the preset center position and the furthest signal coverage point position of the non-inside antenna; and adjusting a present downward inclination angle of the airborne antenna to the target downward inclination angle, to enable a continuous signal coverage region to comprise the target region.

2. The method for continuous signal coverage of the target region of claim 1, wherein determining the antenna type of the airborne antenna based on the antenna direction information, the H-Plane Half Power beamwidth, and the V-Plane Half Power beamwidth comprises:

determining, based on the antenna direction information, whether the airborne antenna is the inside antenna or the non-inside antenna, the inside antenna being an airborne antenna with a direction orientated towards an inside of a flight trajectory of the aircraft;

calculating, in response to determining that the airborne antenna is the inside antenna, a Half Power beamwidth difference based on the H-Plane Half Power beamwidth and the V-Plane Half Power beamwidth of the inside antenna;

determining that the inside antenna is a first inside antenna in response to determining that the Half Power beamwidth difference is greater than a first preset Half Power beamwidth difference threshold; and determining that the inside antenna is a second inside antenna in response to determining that the Half Power beamwidth difference is less than a second preset Half Power beamwidth difference threshold.

3. The method for continuous signal coverage of the target region of claim 2, wherein when the airborne antenna is the first inside antenna, determining the target downward inclination angle of the airborne antenna by using the formula (1) based on the antenna type, the flight height, the maximum flight trajectory distance, the roll angle, the preset center position, the V-Plane Half Power beamwidth, and the furthest signal coverage point position comprises:

calculating the distance between the preset center position and the furthest signal coverage point position; and determining the target downward inclination angle of the airborne antenna by using the formula (1) based on the distance, the maximum flight trajectory distance, the flight height, the V-Plane Half Power beamwidth, and the roll angle.

4. The method for continuous signal coverage of the target region of claim 1, wherein after adjusting the present downward inclination angle of the airborne antenna to the target downward inclination angle, to enable the continuous signal coverage region to comprise the target region, the method further comprises:

acquiring Reference Signal Receiving Power (RSRP) of a user terminal in the target region.

5. An electronic device, applied to an aircraft carrying a communication base station and comprising a processor and a memory storing a computer program instruction, wherein the processor is configured to execute the computer program instruction to implement a method for continuous signal coverage of a target region, comprising:

acquiring a flight height, a maximum flight trajectory distance, a roll angle of the aircraft, and a preset center position of the target region;

acquiring a vertical-Plane (V-Plane) Half Power beamwidth of an airborne antenna of the communication base station and a furthest signal coverage point position relative to the preset center position;

acquiring antenna direction information and a horizontal-Plane (H-Plane) Half Power beamwidth of the airborne antenna;

determining an antenna type of the airborne antenna based on the antenna direction information, the H-Plane Half Power beamwidth, and the V-Plane Half Power beamwidth, the antenna type comprising an inside antenna and a non-inside antenna;

determining a target downward inclination angle of the airborne antenna by using formula (1) or formula (2) based on the antenna type, the flight height, the maximum flight trajectory distance, the roll angle, the preset center position, the V-Plane Half Power beamwidth, and the furthest signal coverage point position;

$$\alpha_1 = \arctan\left(\frac{OG + R}{h}\right) - \beta_1 + \gamma \tag{1}$$

where $\alpha_1$ is the target downward inclination angle of the inside antenna when the airborne antenna is the inside antenna, h is the flight height, R is the maximum flight trajectory distance, $\gamma$ is the roll angle, $\beta_1$ is the V-Plane Half Power beamwidth of the inside antenna, and OG is a distance between the preset center position and the furthest signal coverage point position of the inside antenna;

$$\alpha_1^\sim = \arctan\left(\frac{OA - R}{h}\right) - \beta_1^\sim - \gamma \tag{2}$$

where $\alpha^\sim_1$ is the target downward inclination angle of the non-inside antenna when the airborne antenna is the non-inside antenna, $\beta^\sim_1$ is the V-Plane Half Power beamwidth of the non-inside antenna, and OA is a distance between the preset center position and the furthest signal coverage point position of the non-inside antenna; and adjusting a present downward inclination angle of the airborne antenna to the target downward inclination angle, to enable a continuous signal coverage region to comprise the target region.

6. The electronic device of claim 5, wherein the processor is configured to execute the computer program instruction to:

determine, based on the antenna direction information, whether the airborne antenna is the inside antenna or the non-inside antenna, the inside antenna being an airborne antenna with a direction orientated towards an inside of a flight trajectory of the aircraft;

calculate, in response to determining that the airborne antenna is the inside antenna, a Half Power beamwidth difference based on the H-Plane Half Power beamwidth and the V-Plane Half Power beamwidth of the inside antenna;

determine that the inside antenna is a first inside antenna in response to determining that the Half Power beamwidth difference is greater than a first preset Half Power beamwidth difference threshold; and determine that the inside antenna is a second inside antenna in response to determining that the Half Power beamwidth difference is less than a second preset Half Power beamwidth difference threshold.

7. The electronic device of claim 6, wherein when the airborne antenna is the first inside antenna, the processor is configured to execute the computer program instruction to:

calculate the distance between the preset center position and the furthest signal coverage point position; and determine the target downward inclination angle of the airborne antenna by using the formula (1) based on the first distance, the maximum flight trajectory distance, the flight height, the V-Plane Half Power beamwidth, and the roll angle.

8. The electronic device of claim 5, wherein the processor is configured to execute the computer program instruction to:

acquire Reference Signal Receiving Power (RSRP) of a user terminal in the target region.

9. A non-transitory computer storage medium, having stored a computer program instruction that, when executed by a processor, implements a method for continuous signal coverage of a target region, comprising:

acquiring a flight height, a maximum flight trajectory distance, a roll angle of an aircraft, and a preset center position of the target region;

acquiring a vertical-Plane (V-Plane) Half Power beamwidth of an airborne antenna of a communication base station and a furthest signal coverage point position relative to the preset center position;

acquiring antenna direction information and a horizontal-Plane (H-Plane) Half Power beamwidth of the airborne antenna;

determining an antenna type of the airborne antenna based on the antenna direction information, the H-Plane Half Power beamwidth, and the V-Plane Half Power beamwidth, the antenna type comprising an inside antenna and a non-inside antenna;

determining a target downward inclination angle of the airborne antenna by using formula (1) or formula (2) based on the antenna type, the flight height, the maximum flight trajectory distance, the roll angle, the preset center position, the V-Plane Half Power beamwidth, and the furthest signal coverage point position;

$$\alpha_1 = \arctan\left(\frac{OG + R}{h}\right) - \beta_1 + \gamma \quad (1)$$

where $\alpha_1$ is the target downward inclination angle of the inside antenna when the airborne antenna is the inside antenna, h is the flight height, R is the maximum flight trajectory distance, $\gamma$ is the roll angle, $\beta_1$ is the V-Plane Half Power beamwidth of the inside antenna, and OG is a distance between the preset center position and the furthest signal coverage point position of the inside antenna;

$$\tilde{\alpha_1} = \arctan\left(\frac{OA - R}{h}\right) - \tilde{\beta_1} - \gamma \quad (2)$$

where $\tilde{\alpha}_1$ is the target downward inclination angle of the non-inside antenna when the airborne antenna is the non-inside antenna, $\tilde{\beta}_1$ is the V-Plane Half Power beamwidth of the non-inside antenna, and OA is a distance between the preset center position and the furthest signal coverage point position of the non-inside antenna; and adjusting a present downward inclination angle of the airborne antenna to the target downward inclination angle, to enable a continuous signal coverage region to comprise the target region.

10. The non-transitory computer storage medium of claim 9, wherein determining the antenna type of the airborne antenna based on the antenna direction information, the H-Plane Half Power beamwidth, and the V-Plane Half Power beamwidth comprises:

determining, based on the antenna direction information, whether the airborne antenna is the inside antenna or the non-inside antenna, the inside antenna being an airborne antenna with a direction orientated towards an inside of a flight trajectory of the aircraft;

calculating, in response to determining that the airborne antenna is the inside antenna, a Half Power beamwidth difference based on the H-Plane Half Power beamwidth and the V-Plane Half Power beamwidth of the inside antenna;

determining that the inside antenna is a first inside antenna in response to determining that the Half Power beamwidth difference is greater than a first preset Half Power beamwidth difference threshold; and determining that the inside antenna is a second inside antenna in response to determining that the Half Power beamwidth difference is less than a second preset Half Power beamwidth difference threshold.

11. The non-transitory computer storage medium of claim 10, wherein when the airborne antenna is the first inside antenna, determining the target downward inclination angle of the airborne antenna by using the formula (1) based on the antenna type, the flight height, the maximum flight trajectory distance, the roll angle, the preset center position, the V-Plane Half Power beamwidth, and the furthest signal coverage point position comprises:

calculating the distance between the preset center position and the furthest signal coverage point position; and determining the target downward inclination angle of the airborne antenna by using the formula (1) based on the first-distance, the maximum flight trajectory distance, the flight height, the V-Plane Half Power beamwidth, and the roll angle.

12. The non-transitory computer storage medium of claim 9, wherein after adjusting the present downward inclination angle of the airborne antenna to the target downward inclination angle, to enable the continuous signal coverage region to comprise the target region, the method further comprises:

acquiring Reference Signal Receiving Power (RSRP) of a user terminal in the target region.

* * * * *